US008223932B2

(12) United States Patent
Forbes et al.

(10) Patent No.: US 8,223,932 B2
(45) Date of Patent: Jul. 17, 2012

(54) APPENDING CONTENT TO A TELEPHONE COMMUNICATION

(75) Inventors: Scott C. Forbes, Robbinsville, NJ (US); Sean Olson, Duvall, WA (US); Jeremy Buch, Louisville, CO (US); Dawson Yee, Redmond, WA (US); Timothy Mark Moore, Bellevue, WA (US); Kalyan Shankar Basu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1159 days.

(21) Appl. No.: 12/049,281

(22) Filed: Mar. 15, 2008

(65) Prior Publication Data

US 2009/0232288 A1 Sep. 17, 2009

(51) Int. Cl.
*H04M 11/00* (2006.01)

(52) U.S. Cl. ............... 379/93.23; 379/90.01; 379/93.25; 379/93.15; 704/270

(58) Field of Classification Search ............... 379/93.23, 379/93.25, 93.17, 90.01, 93.21, 93.15; 704/270, 704/270.1, 251
See application file for complete search history.

(56) References Cited

U.S. PATENT DOCUMENTS

| 5,526,406 | A | 6/1996 | Luneau | |
|---|---|---|---|---|
| 5,559,860 | A | 9/1996 | Mizikovsky | 379/58 |
| 5,764,279 | A | 6/1998 | Ford et al. | 348/15 |
| 6,122,347 | A | 9/2000 | Borland | 379/70 |
| 6,373,925 | B1 | 4/2002 | Guercio et al. | 379/82 |
| 6,529,586 | B1 | 3/2003 | Elvins et al. | 379/88.13 |
| 6,711,239 | B1 | 3/2004 | Borland | 379/67.1 |
| 6,944,277 | B1 | 9/2005 | Viikki | 379/142.06 |
| 6,970,915 | B1 | 11/2005 | Partovi et al. | 709/217 |
| 7,127,238 | B2 | 10/2006 | Vandermeijden et al. | 455/415 |
| 7,127,400 | B2 | 10/2006 | Koch | 704/270.1 |
| 7,127,403 | B1 | 10/2006 | Saylor et al. | 704/275 |
| 7,142,645 | B2 | 11/2006 | Lowe | 379/88.16 |
| 7,242,754 | B2 | 7/2007 | Adams et al. | 379/201.02 |
| 7,620,160 | B2 | 11/2009 | Tidwell et al. | 379/88.25 |
| 7,653,380 | B2 | 1/2010 | Graefen | 455/414.1 |

(Continued)

FOREIGN PATENT DOCUMENTS

WO  WO 03/052607 A1  6/2003

(Continued)

OTHER PUBLICATIONS

U.S. Office Action cited in U.S. Appl. No. 11/824,474 mailed Jun. 8, 2011, 13 pgs.

(Continued)

*Primary Examiner* — Stella Woo
(74) *Attorney, Agent, or Firm* — Merchant & Gould

(57) ABSTRACT

An interactive information distribution system that facilitates automatic transmission of a variety of information packets to the communication devices of a calling party and parties called during a call. The information packets are comprised of actual files and or links to files or websites, and are automatically transmitted following the initiation of a call. Upon initiating a call, an indicator that may include metadata linked to information packets is processed to identify at least one database for locating information packets to which the metadata is linked. The interactive information distribution system also includes a verbal communication conversion engine that allows verbal telephone communications to be converted to text and filtered to generate keywords which are used in additional database searching to identify additional information packets. The information packets automatically identified are retrieved from a database and are transmitted to the communication devices of parties participating in a call during the call.

20 Claims, 5 Drawing Sheets

U.S. PATENT DOCUMENTS

| | | | |
|---|---|---|---|
| 2001/0048736 A1 | 12/2001 | Walker et al. | 379/88.23 |
| 2004/0037403 A1 | 2/2004 | Koch | |
| 2004/0081305 A1 | 4/2004 | Gonzalez et al. | |
| 2004/0218743 A1 | 11/2004 | Hussain et al. | 379/201.11 |
| 2004/0235520 A1 | 11/2004 | Cadiz et al. | |
| 2005/0117730 A1 | 6/2005 | Mullis et al. | 379/210.02 |
| 2006/0003761 A1 | 1/2006 | Fry et al. | 455/426.1 |
| 2006/0028951 A1 | 2/2006 | Tozun et al. | 369/84 |
| 2006/0052091 A1 | 3/2006 | Onyon et al. | |
| 2006/0104293 A1 | 5/2006 | Kopp et al. | 370/401 |
| 2006/0165050 A1 | 7/2006 | Erhart et al. | 370/351 |
| 2006/0206340 A1 | 9/2006 | Silvera et al. | 704/278 |
| 2006/0210033 A1 | 9/2006 | Grech et al. | 379/88.19 |
| 2006/0291640 A1 | 12/2006 | Nagesh et al. | 379/211.02 |
| 2007/0036284 A1 | 2/2007 | Raghav et al. | 379/67.1 |
| 2007/0117549 A1 | 5/2007 | Arnos | |
| 2008/0034064 A1* | 2/2008 | Choi et al. | 709/219 |
| 2008/0130632 A1 | 6/2008 | Leong | 370/352 |
| 2008/0275701 A1* | 11/2008 | Wu et al. | 704/235 |
| 2009/0003538 A1 | 1/2009 | Sharpe et al. | 379/70 |
| 2009/0003580 A1 | 1/2009 | Sharpe et al. | 379/211.02 |
| 2011/0231182 A1* | 9/2011 | Weider et al. | 704/9 |

FOREIGN PATENT DOCUMENTS

WO    WO 2005/088990 A1    9/2005

OTHER PUBLICATIONS

U.S. Final Office Action cited in U.S. Appl. No. 11/824,498 mailed May 6, 2011.

Drishti-Soft.Com., "PACE Ahead with DACX Ameyo," pp. 1-3, <http://www.drishti-soft.com/ivr.php>, Jun. 18, 2009.

FileCart.com, "Xtend IVR Developer Edition 3.0," pp. 1-2, Aug. 16, 2007, http://www.filecart.com/details/30878/357/XTend_IVR_Developer_Edition.php.

CTiLabs, "Mobile Ringback Tone Service," Date: Nov. 24, 2004, pp. 1-4, http://www.ctilabs.de/de/sol/infos/ringback.pdf.

Microsoft.com/Speech/Speech2004, "Microsoft Speech Server: Features & Benefits," pp. 1-2, http://www.microsoft.com/speech/evaluation/tools/default.mspx, publically known at least as early as Mar. 15, 2008.

3D2F.com, "CallButler Unlimited 1.0," Nov. 12, 2006, pp. 1-4, http://3d2f.com/programs/1-640-callbutler-unlimited-download.shtml.

Office Action mailed Sep. 30, 2010, in co-pending U.S. Appl. No. 11/824,498.

AllWorldSoft.Com., "PhoneTray Fee 1.20," Date: Apr. 3, 2007, pp. 1-2, http://wwww.allworldsoft.com/software/13-506-phonetray-free.htm.

ClassCo, "More Than Caller ID—Convenience—Security—Accessibility," Date: Apr. 3, 2007, pp. 1-4, https://www.classco.com/catalog.php.

New Telephone Speech Corpora at CSLU, 1995, pp. 1-4, http://citeseer.comp.nus.edu.sg/cache/papers/cs/2304/ftp:zSzzSzspeech.cse.ogi.eduzSzpubzSzdocszSzcorpus.devl.pdf/cole95new.pdf.

Sawhney et al., *ACM Transactions on Computer-Human Interaction*, 7(3): Sep. 2000, pp. 353-383 "Nomadic Radio: Speech and Audio Interaction for Contextual Messaging in Nomadic Environments," http://interruptions.net/literature/Sawhney-TOCHI00-p353-sawhney.pdf.

Smarthome, "The Caller ID System That Speaks for Itself," Date: Apr. 3, 2007, pp. 1-4, http://www.smarthome.com/5I54cw.html.

SoftRunner Inc., "eCaller ID™ It Speaks for Itself," Date: Apr. 3, 2007, pp. 1-5, http://softrunner.com/callerid/.

U.S. Appl. No. 11/824,498, filed Jun. 29, 2007, entitled "Mobile Telephone Interactive Call Disposition System," Inventors: Timothy D. Sharpe and Cameron Ali Etezadi.

U.S. Appl. No. 11/824,474, filed Jun. 29, 2007, entitled "Automated Unique Call Announcement," Inventors: Timothy D. Sharpe and Cameron Ali Etezadi.

Cisco Systems, "Cisco IPCC Callback Option Data Sheet," Printed Jun. 18, 2009, pp. 1-5, http://www.cisco.com/web/CA/events/pdfs/IPCC_Callback_Option_DS.pdf.

U.S. Office Action mailed Nov. 30, 2011 in U.S. Appl. No. 11/824,474, 11 pages.

\* cited by examiner

*Mobile Computing Device*

APPENDING CONTENT TO A TELEPHONE COMMUNICATION

RELATED CASE

This application is related to U.S. patent application Ser. No. 11/824,474, entitled "Automated Unique Call Announcement," filed Jun. 29, 2007 and U.S. patent application Ser. No. 11/824,498, entitled "Mobile Telephone Interactive Call Distribution System," filed Jun. 29, 2007, which applications are hereby incorporated by reference.

BACKGROUND

Voice communications generally are received by a calling party without any context. So if a first party calls a second party, the second party has no idea what the call is about until the first party starts talking and explains why they initiated the communication. People have tried to sidestep this issue by having a personal assistant screen calls, acting as a human filter. In modern mobile and wired telephones, methods and systems are used as an automatic filter, such as voice mail, where a person may be forced to leave a message identifying who they are and what the call is about in order for them to receive a call back. Text-based caller identification provides some level of context by displaying the identity of a caller on a screen on a telephone to allow a called party to see an identification of a calling party before a telephone call is answered. A text-to-speech (TTS) system may be used to speak aloud a name presented in a caller identification field in association with a calling party. Some telephones allow custom ring tones to be assigned to specific telephone numbers, but the assignment of custom ring tones to specific numbers is not an automated process. Even if a caller is identified by TTS technology, or a unique ring tone, often times an individual receives such communication without any context. Accordingly, a user who accepts a call from someone has no idea what that call may be about until the user starts talking with them. There is a need for a system which provides information other than caller identification data along with a call in real-time so as to provide the party called with as much information and context as possible about an incoming call so that the call recipient can conduct a conversation with all necessary information. In the past, such information was provided asynchronously, such as by sending an email prior to the voice communication.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the invention solve the above and other problems by providing a system that facilitates information distribution over a communications network that allows voice and data transmissions during a telephone call, whereby the system may be operative over a VOIP network, mobile communications network or combination thereof with any network-based computer system. Upon initiation of a telephone call, the automatic information distribution system receives an indicator of the initiated telephone call and automatically processes the indicator to identify at least one database for searching, searches the database identified for information associated with the telephone call, retrieves and transmits the associated information to at least one party participating in the call. The system also includes transmission control and speech recognition modules. The transmission control module manages the information transmitted based upon the type of device initiating or receiving a call and the communications network through which the call initiating or receiving device is communicating. The speech recognition module filters the conversation between parties participating in a call to identify key words and utilizes the key words to search for additional information associated with the key words which may be transmitted in real-time to the call participants during the call. The automatic information distribution system also processes and transmits supplemental files associated with the call initiating party and the call receiving party, such as calendar data, free/busy data, contacts information, and associated files during the voice communication.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
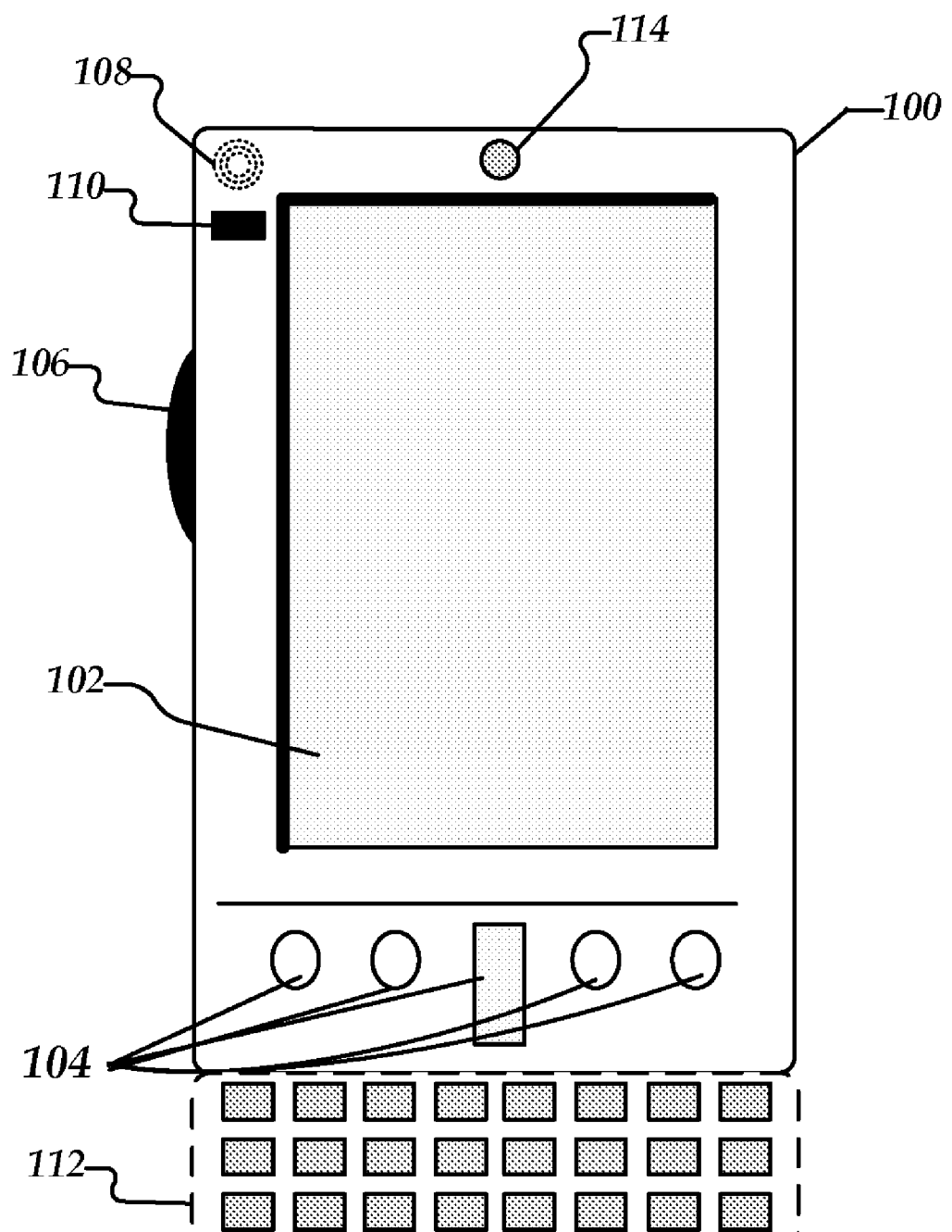
FIG. 1 is a diagram of an example mobile telephone/computing device.

As briefly described above, embodiments of the present invention are directed to automatic information distribution over a communications network during a live voice communication. The invention is a system that includes a module capable of automatically inferring from the metadata in a telephone call information relevant to the call that is retrieved and transmitted to a caller upon initiation of a call. The system also includes a module capable of inferring from the content of telephone conversation keywords that may be used to identify information from an entire body of data or a finite body of information that has been pre-selected. The information identified is extracted and transmitted to individuals involved in the telephone call during the call in whatever format is useful. The voice communication may be on a mobile telephone, VOIP phone, video phone or any other communication device that allows both voice and data communication over the communications network.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention may be utilized for both mobile and wired voice communication devices through which both voice and data transmission may be communicated. For purposes of illustration, embodiments of the present invention will be described herein with reference to a mobile computing device 100 having a voice communication system 200, but it should be appreciated that the components described for the mobile computing device 100 with its mobile voice communication system 200 are equally applicable to a wired voice communication device having similar or equivalent functionality for automatically searching for and providing data associated with parties involved in the voice communication as described herein.

The following is a description of a suitable mobile computing device, for example, a camera phone or camera-enabled computing device, discussed above, with which embodiments of the invention may be practiced. With reference to FIG. 1, an example mobile computing device 100 for implementing the embodiments is illustrated. In a basic configuration, mobile computing device 100 is a handheld computer having both input elements and output elements. Input elements may include touch screen display 102 and input buttons 104 and allow the user to enter information into mobile computing device 100. Mobile computing device 100 also incorporates a side input element 106 allowing further user input. Side input element 106 may be a rotary switch, a button, or any other type of manual input element. In alternative embodiments, mobile computing device 100 may incorporate more or less input elements. For example, display 102 may not be a touch screen in some embodiments. In yet another alternative embodiment, the mobile computing device is a portable phone system, such as a cellular phone having display 102 and input buttons 104. Mobile computing device 100 may also include an optional keypad 112. Optional keypad 112 may be a physical keypad or a "soft" keypad generated on the touch screen display. Yet another input device that may be integrated to mobile computing device 100 is an on-board camera 114.

Mobile computing device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Embodiments of the invention may also be practiced in distributed computing environments where queries are performed and information is gathered by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

Figure 2:
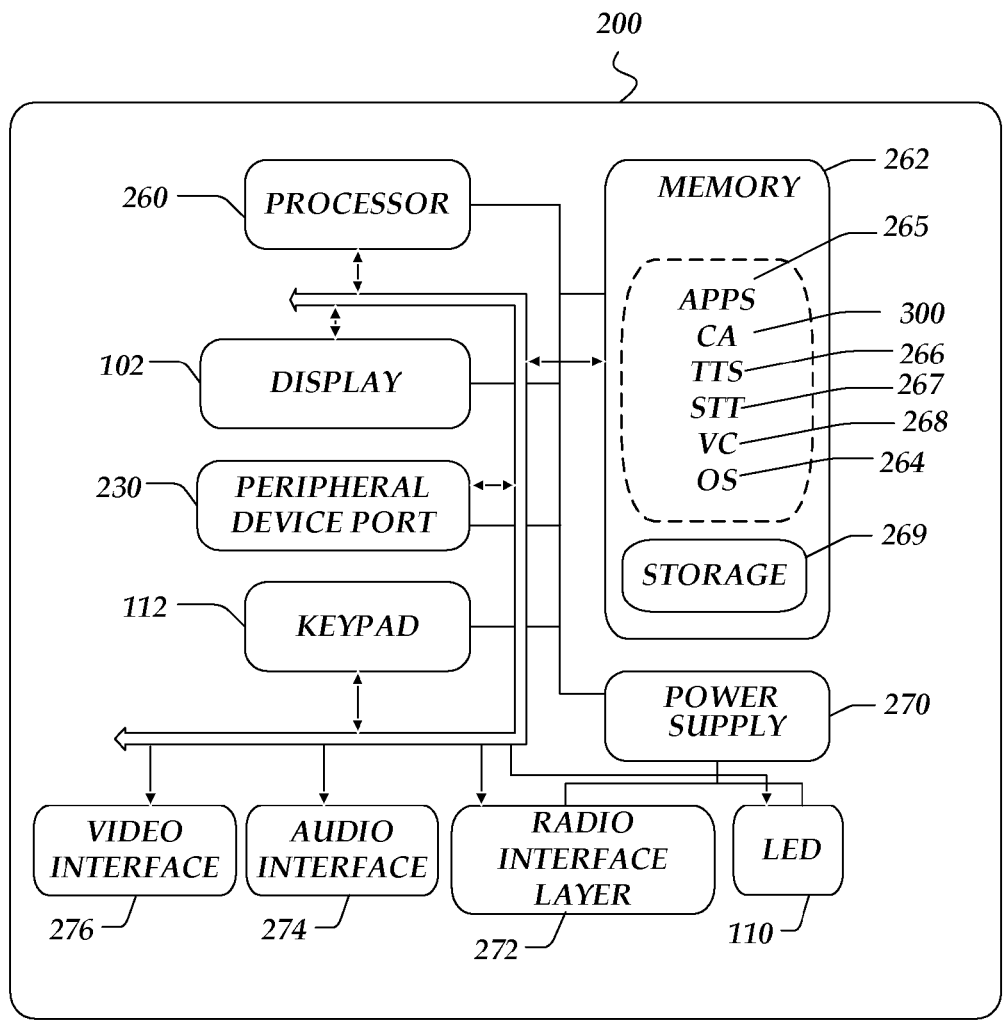
FIG. 2 is a block diagram illustrating components of a mobile telephone/computing device that may serve as an operating environment for the embodiments of the invention.

FIG. 2 is a block diagram illustrating components of a mobile computing device used in one embodiment, such as the mobile telephone/computing device 100 illustrated in FIG. 1. That is, mobile computing device 100 (FIG. 1) can incorporate system 200 to implement some embodiments. For example, system 200 can be used in implementing a "smart phone" that can run one or more applications similar to those of a desktop or notebook computer such as, for example, browser, email, scheduling, instant messaging, and media player applications. System 200 can execute an Operating System (OS) such as, WINDOWS XP®, WINDOWS MOBILE 2003®, WINDOWS CE®, WINDOWS LIVE MESSENGER™, available from MICROSOFT CORPORATION, REDMOND, WASH. In some embodiments, system 200 is integrated as a computing device, such as an integrated personal digital assistant (PDA) and wireless phone. In other embodiments the system is integrated with VOIP communications systems.

In this embodiment, system 200 has a processor 260, a memory 262, display 102, and keypad 112. Memory 262 generally includes both volatile memory (e.g., RAM) and non-volatile memory (e.g., ROM, Flash Memory, or the like). System 200 includes an Operating System (OS) 264, which in this embodiment is resident in a flash memory portion of memory 262 and executes on processor 260. Keypad 112 may be a push button numeric dialing pad (such as on a typical telephone), a multi-key keyboard (such as a conventional keyboard), or may not be included in the mobile computing device in deference to a touch screen or stylus. Display 102 may be a liquid crystal display, or any other type of display commonly used in mobile computing devices. Display 102 may be touch-sensitive, and would then also act as an input device.

One or more application programs 265 are loaded into memory 262 and run on or outside of operating system 264. Examples of application programs include phone dialer programs, e-mail programs, voice recognition programs, PIM (personal information management) programs, such as electronic calendar and contacts programs, word processing programs, spreadsheet programs, Internet browser programs, and so forth. One specific program that may run on or outside of the operating system 264 is OFFICE COMMUNICATOR available from MICROSOFT CORPORATION, REDMOND, WASH. OFFICE COMMUNICATOR is a unified communications client that helps communicating individuals be more productive by enabling them to communicate easily with others in different locations or time zones using a range of different communication options, including instant messaging (IM), voice, and video. System 200 also includes non-volatile storage 269 within memory 262. Non-volatile storage 269 may be used to store persistent information that should not be lost if system 200 is powered down. Applications 265 may use and store information in non-volatile storage 269, such as e-mail or other messages used by an e-mail application, contact information used by a PIM, documents used by a word processing application, and the like. A synchronization application (not shown) also resides on system 200 and is programmed to interact with a corresponding synchronization application resident on a host computer to keep the information stored in non-volatile storage 269 synchronized with corresponding information stored at the host computer. In some embodiments, non-volatile storage 269 includes the aforementioned flash memory in which the OS (and possibly other software) is stored.

As briefly described above, the applications 265 may include a variety of applications useful in providing information in support of the voice communication between parties engaged in voice communications. For example, the applications 265 may include word processing programs, spreadsheet programs, Internet browser programs, electronic scheduling, calendaring, voice recognition engine, and contacts programs, for example, MICROSOFT OUTLOOK, with which electronic mail, calendaring information, scheduling information and contacts information may be maintained by a first call party on a second call party in data storage on the telephone/computing device 100. When a call is initiated call data other than caller identification data may be automatically distributed to one or all callers involved in the voice communication. Upon initiation of the call, an indicator may be generated or retrieved from data storage. The indicator may include metadata used for identifying information that may be associated with the initiated call. The indicator is processed to identify the files to be searched for information associated with the call. The information derived from the search is retrieved and all or a portion of the files may be transmitted to a party participating in a call, while the call is in progress. The portion of the data transmitted is controlled by a set of data transmission rules that transmits data depending upon the type of communication devices involved in the call. In the present embodiment, it is contemplated that the mobile computing device 100 is communicating on a network that facilitates both data and voice transmission. It is also contemplated that all data may be transmitted with the understanding that certain types of data cannot be received by certain voice communication devices. The types of voice communication devices include, but are not limited to analog phones, digital phones, VOIP phones, video phones, computers, smart phones, and mobile computing devices.

By way of example, once a call is initiated, part of the metadata being transmitted with a call that is linked with the data associated with a party being called may be a spreadsheet name, the actual spreadsheet, or a link to a shared data site at which callers participating in a call may be provided temporary access in order to access a folder or file share. The information may be stored at storage 269.

The applications 265 may include additional applications useful for providing automatic information distribution over a network during voice communications between at least two parties or one call party's interaction with a computer system. An application could be used to analyze the content of the call or how the call originated. Information collected from the analysis could be used to facilitate sending information. For example, a global positioning system (GPS) application for obtaining location information for the calling or called party may be provided. In this example, if the calling party is calling from the mobile telephone/computing device 100, a global positioning system application may be utilized for determining a location of the calling party and for presenting that information to the called party as part of the information presented to the called party. Other positioning systems may be utilized as alternates to a global positioning system. For example, an application programming interface (API) may be utilized in the mobile computing device 100 for calling a local or remote location service or computer system and for passing contact information or other identifying information for a calling party to a location service that responds to the identifying information by returning location information, such as a map for the location at which the calling party is located.

More specifically, if mobile computing device 100 includes GPS capabilities, an individual out biking or walking that happens to be within range of a WiFi hot spot, the GPS would identify the individual's location through the GPS receiver in the individual's mobile telephone 100 or other handheld device. The system within the mobile computing 100 receives information indicating that the individual is biking or walking and desires a map of the area, map of parks, or bike trails. Upon an indication that, for example, the individual is biking, the individual may be automatically supplied with a map of bike trails within an area or the fastest route to a specified location. Alternatively, the individual may have to signify to a service or system that a map of bike trails is needed and the map would be transmitted to the individual's computing and communication device.

Figure 3:
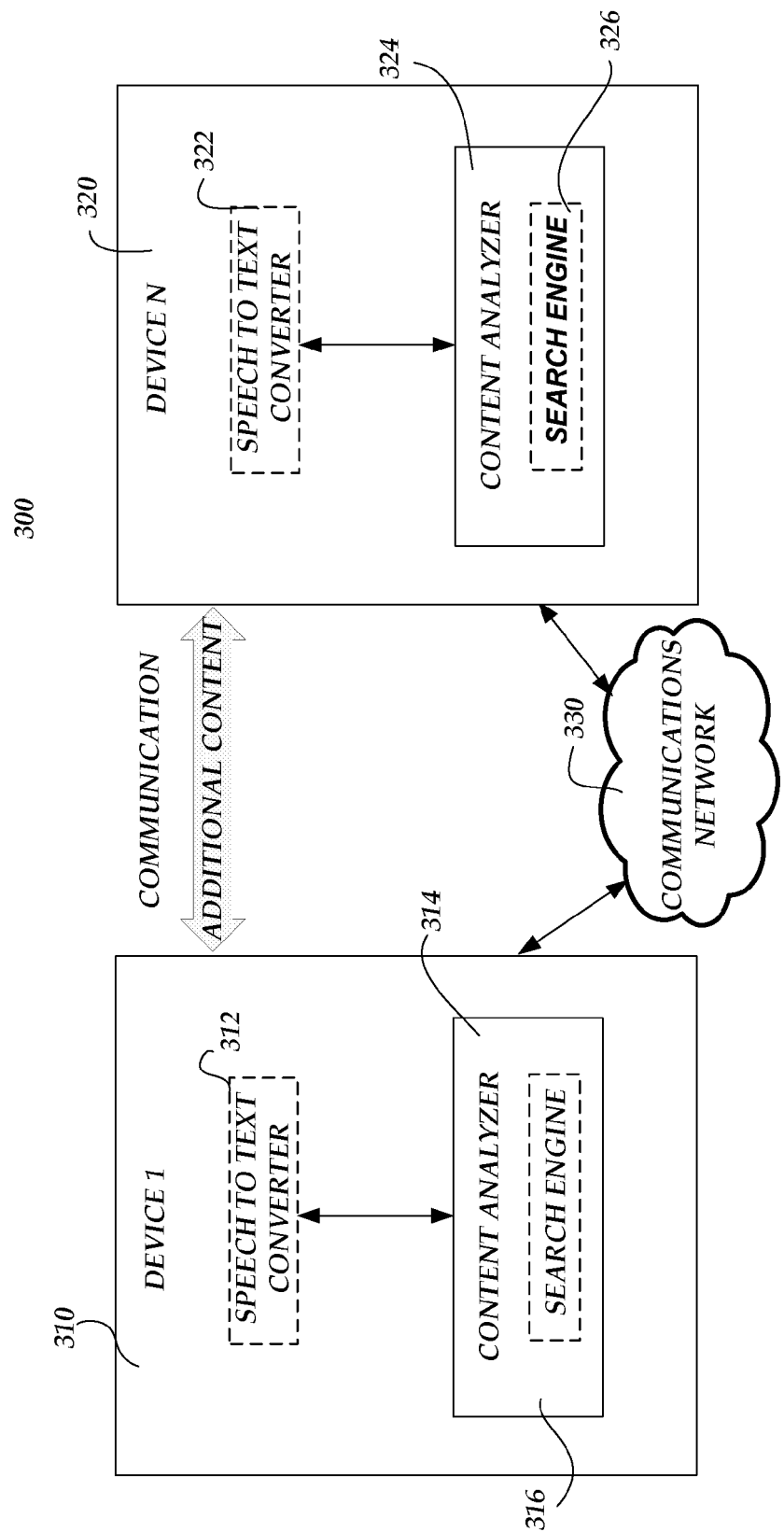
FIG. 3 is a simplified block diagram illustrating components within an embodiment of an automatic information distribution computing system.
Figure 4:
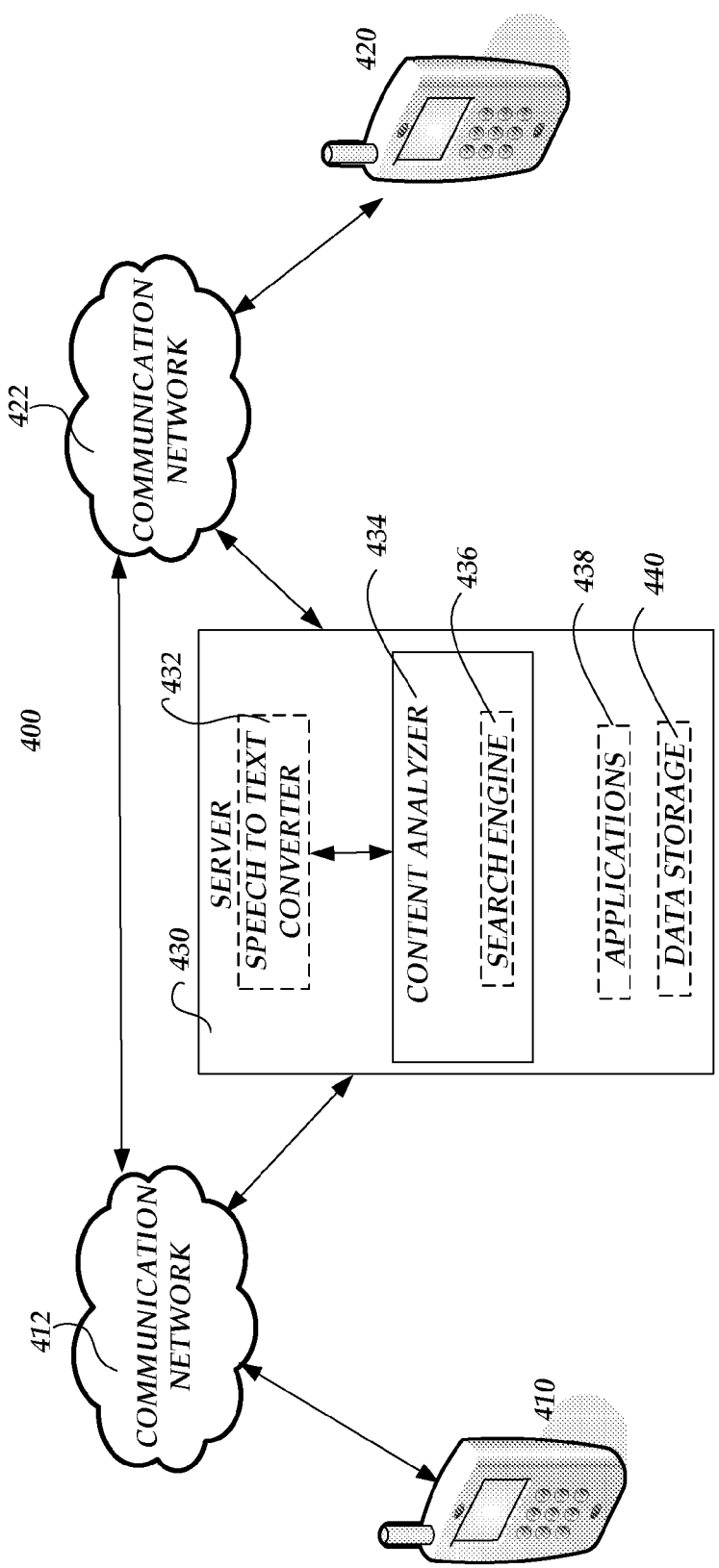
FIG. 4 is a simplified block diagram illustrating components within another embodiment of an automatic information distribution computing system.

FIGS. 3 and 4 illustrate the architectural environment of the system, whereby the system may be configured as a peer to peer system, as illustrated in FIG. 3 or a client to server system as illustrated in FIG. 4. It is also contemplated that the system may be functional in a server to server environment. Referring to FIG. 3, in a peer to peer communication environment, the system 300 is comprised of a first mobile computing device 310 having the mobile voice communication system illustrated in FIG. 2, complete with a processor, memory, display, keypad, and audio and video interface. System 300 further includes a second mobile computing device 320 having the mobile voice communication system illustrated in FIG. 2 and a communications network 330, which, depending on the mobile computing device, may be a mobile phone network, a computer network or VOIP communications network.

The mobile computing devices 310 and 320, having the mobile voice communication system illustrated in FIG. 2 are operative to provide a variety of information packets, comprised of actual files and or links to files or websites, to a called party's communication device. As illustrated in FIG. 3, communication device 310 includes a speech to text converter module 312, and a content analyzer 314. The speech to text converter module 312 converts the words spoken by parties involved in a telephone call to text. The content analyzer 314 filters the converted text and infers key words to be used for searching by the search engine 316. The search engine searches for data within the computing device data storage for actual files and or links to files or websites that are mapped to the keywords inferred by the content analyzer 314. Following the identification of actual files and or links to files or websites in response to searching the keywords generated by the content analyzer, this information is transmitted across communications network 330 to the computing device 320 of another party during the voice communication. It is contemplated that in addition to transmitting actual files and or links to files or websites to communication device 320, communication device may be pre-programmed to also send the information transmitted to an email address associated with the party to whom a call is placed. The email address may be accessed automatically from one of the applications running on communication device 310, such as MICROSOFT OUTLOOK. The architecture of the present invention is described above with the use of mobile computing devices 310 and 320. However, it is contemplated that the computing devices may be equally operative as wired telephones.

In the client to client environment, communication device 320 also includes a speech to text converter module 322, and a content analyzer 324. The speech to text converter converts the words spoken by parties involved in a telephone call to text. The content analyzer 324 processes the converted text and infers key words to be used for searching by the search engine 326. The search engine searches for data within the communication device data storage for actual files and or links to files or websites that are mapped to the keywords inferred by the content analyzer 324. Following the identification of actual files and or links to files or websites in response to searching the keywords generated by the content analyzer, this information is transmitted across communications network 330 to the communication device 310 of the call initiating party during the voice communication.

Referring back to FIG. 2, the speech to text converter (STT) module 267 is a software application operative to receive an audible input from a called or calling party and for recognizing the audible input for use facilitating the conversion of conversation into keywords that may be used to search for content that may be distributed to callers involved in communication on a computing device. As is well known to those skilled in the art, the STT engine 267 may access a large lexicon or library of spoken words it has been trained to understand and to recognize, for example, names, places, nouns, verbs, articles, or any other word of a designated spoken language for generating text representative of the spoken word. The lexicon of spoken words may be stored at storage 269. According to embodiments of the present invention, once spoken words are converted to text the text may be accessed and displayed on display 102. In addition, these converted spoken words are also processed by content analyzer 314 in order to infer key words that are used for database searching to identify information relevant to the spoken words. The converted spoken words are also processed by the content analyzer 314 which may infer functions.

For example, one of the parties in a phone conversation states, "I wonder if Susan Johnson is available next Tuesday at 10 A.M." The content analyzer will infer from these words that a determination should be made as to whether Susan Johnson is available next Tuesday at 10 A.M and attempt to make such a determination by accessing Susan Johnson's, electronic calendar, to the extent, the calling party has such access. As part of this analysis the system would identify who Susan Johnson is based on all the other Susan Johnson's that the system is aware of As part of the inquiry the system would search the call initiating party's and the call receiving party's corporate directories for Susan Johnson. If the system can identify Susan Johnson, the system shall access Susan's schedule and determine her availability. Upon determination of her availability, a communication shall be sent to all parties involved in the call advising of her availability. The communication may be text or verbal. Verbal communication shall be accomplished by utilizing the text-to-speech module 266.

If the system cannot identify Susan Johnson, it may interactively seek input from a caller to determine who Susan is. In one embodiment, the system may ask a question, using whatever format is available. For example, the system may drop the volume of the call and query a caller, "which Susan Johnson did you mean?" The system could, mute the phone of a caller during the inquiry to allow the caller to answer and without other callers involved in the call being aware that this has occurred. The system may also be configured to allow automatic determination of Susan Johnson. For example, if some of the callers know the Susan Johnson to whom a caller is referring because one or more callers personally works with Susan Johnson and communicates with her regularly, the system can be programmed to know that a mentioning of Susan Johnson in a call of specific callers are involved party refers to a specific Susan Johnson.

In addition to identifying a person, the system attempts to identify the type of medium upon which the parties are communicating and the performance parameters thereof For example, if the callers are communicating on simple mobile phones or hard wired phones that do not have broadband data or visual display capability, more than likely, the system will not attempt to transmit a picture or attempt to bring Susan Johnson into the telephone conference via video conference. On the other hand, if a caller is on a megabit system and has a 20 inch display monitor and a camera and typically the caller uses video conferences, the system may attempt to include Susan Johnson by way of video conference. The manner in which Susan John is joined in a conference would depend on the type of medium she has access to and the information that Susan may need to be conveyed.

The voice communication system 200 also includes a text-to-speech (TTS) module 266. The TTS module 266 is a software application operative to receive text-based information to generate an audible announcement from the received information. As is well known to those skilled in the art, the TTS module 266 may access a large lexicon or library of spoken words, for example, names, places, nouns, verbs, articles, or any other word of a designated spoken language for generating an audible announcement for a given portion of text. The lexicon of spoken words may be stored at storage 269. According to embodiments of the present invention, once an audible announcement is generated from a given portion of text, the audible announcement may be played via the audio interface 274 of the telephone/computing device 100 through a speaker, earphone or headset associated with the telephone 100. For example, following a determination that Susan John is not available for a meeting on the next Tuesday at 10 A.M., the content analyzer processes such information, and infers a text statement such as "Susan Johnson is not available for a meeting next Tuesday at 10 A.M." and sends it to the TTS module 266. The TTS module 266 may utilize a large lexicon of spoken words to generate an audible announcement of "Susan Johnson is not available for a meeting next Tuesday at 10 A.M.," that may be played to the parties involved with the telephone call via a speaker on a voice computing device or via an associated earphone or headset.

The voice communication system 200 also includes a voice command (VC) module 268. The VC module 268 is a software application operative to receive audible input at the mobile computing device 100 and to convert the audible input to a command that may be used to push specific content from mobile computing device 100 or from a server. According to one embodiment, the VC module 268 may be comprised of a large lexicon of spoken words, a recognition function and an action function. The lexicon of spoken words may be stored at storage 269. When a command is spoken into a microphone of the telephone/computing device 100, the voice command module 268 receives the spoken command and passes the spoken command to a recognition function that parses the spoken words and applies the parsed spoken words to the lexicon of spoken words for recognizing each spoken word. Once the spoken words are recognized by the recognition function, a recognized command, for example, "transmit the latest version of RTC whitepaper," may be passed to an action functionality that may be operative to direct the activities of the telephone 100. For example, a spoken phrase such as "transmit the latest version of RTC whitepaper," may be utilized by the voice command module to invoke the data retrieval functionality of the telephone 100 or a server, to locate the latest version of the RTC whitepaper and transmits it to other individuals participating in the call.

System 200 has a power supply 270, which may be implemented as one or more batteries. Power supply 270 might further include an external power source, such as an AC adapter or a powered docking cradle that supplements or recharges the batteries.

System 200 may also include a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 265 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 200 is shown with two types of notification output devices. The LED 110 may be used to provide visual notifications and an audio interface 274 may be used with speaker 108 (FIG. 1) to provide audio notifications. These devices may be directly coupled to power supply 270 so that when activated, they remain on for a duration dictated by the notification mechanism even though processor 260 and other components might shut down for conserving battery power. LED 110 may be programmed to remain on indefinitely until the user takes action to indicate the powered-on status of the device. Audio interface 274 is used to provide audible signals to and receive audible signals from the user. For example, in addition to being coupled to speaker 108, audio interface 274 may also be coupled to a microphone to receive audible input, such as to facilitate a telephone conversation. In accordance with embodiments of the present invention, the microphone may also serve as an audio sensor to facilitate control of notifications, as will be described below.

System 200 may further include video interface 276 that enables an operation of on-board camera 114 (FIG. 1) to record still images, video stream, and the like. According to some embodiments, different data types received through one of the input devices, such as audio, video, still image, ink entry, and the like, may be integrated in a unified environment along with textual data by applications 265.

A mobile computing device implementing system 200 may have additional features or functionality. For example, the device may also include additional data storage devices (removable and/or non-removable) such as, magnetic disks, optical disks, or tape. Such additional storage is illustrated in FIG. 2 by storage 269. Computer storage media may include volatile and nonvolatile, removable and non-removable media implemented in any method or technology for storage of information, such as computer readable instructions, data structures, program modules, or other data.

Referring now to FIG. 4, an embodiment of the invention in which the system is configured for client to server communications is described. In this embodiment, the mobile computing devices 410 and 420 transmit and receive voice and data communications in a manner similar to that described in FIG. 3. In addition, server 430 also includes a speech to text converter module 432, a content analyzer module 434 and a search engine 436. The speech to text converter module 432 converts the words spoken by parties involved in a telephone call to text. The content analyzer 434 processes the converted text and infers key words to be used for searching by the search engine 436. The search engine 436 searches for data within server data storage 440 for actual files and or links to files or websites that are mapped to the keywords inferred by the content analyzer 434. Following the identification of actual files and or links to files or websites in response to searching the keywords generated by the content analyzer module 434, this information is transmitted across communications networks 412 and 422 to communication devices 410 and 420 of the parties participating in the call. It is to be understood that if there are multiple parties involved in the call, the server 430 facilitates the transmission of data to all or select parties. It is contemplated that in addition to transmitting actual files and or links to files or websites to communication devices 410 and 420 of the parties participating in the call, server 430 may also be configured to send the information transmitted to communication devices 410 and 420 to an email address associated with the parties on the call. The email address may be accessed automatically from one of the applications running on server 430, such as MICROSOFT OUTLOOK, that includes contact and other information for individuals involved in the call. The present invention is illustrated as part of a mobile telephone 100, but could be equally operative on a wired telephone.

As illustrated in FIGS. 3 and 4, the modules that drive the functionality of the automatic information distribution of the present invention may be on a server only, client only, or on both the client and server. It is also contemplated that a third party service with servers in the communication cloud at a data center in some remote location may be performing portions of the analysis necessary to perform the querying, filtering, voice recognition, speech to text conversion, and information retrieval and transmission necessary for automatic information transmission. In the client to client environment illustrated in FIG. 3, the automatic information distribution functionality of the present invention is resident on communication devices 310 and 320. In this embodiment, modules for controlling voice recognition, speech to text, content analysis, content inference, querying, identification of information and subsequent transmission, are all located on communication devices 310 and 320. FIG. 4, illustrates an alternative embodiment in which the automatic information distribution functionality of the present invention is resident on server 430. In this embodiment, modules for controlling speech to text, content analysis, content inference, querying, identification of information and subsequent transmission, are also located on server 430. The automatic information distribution functions may all or partially be carried out via server 430. It is contemplated that in this environment, a party may be using a basic analog phone or digital phone. In this environment server 430 utilizes metadata associated with the phone number from which a call is initiated and metadata associated with the phone number to which a call is made to identify files and information within data storage 440 that may be relevant to the callers. Type of data and the amount transmitted depends on the communication device used by a caller.

Figure 5:
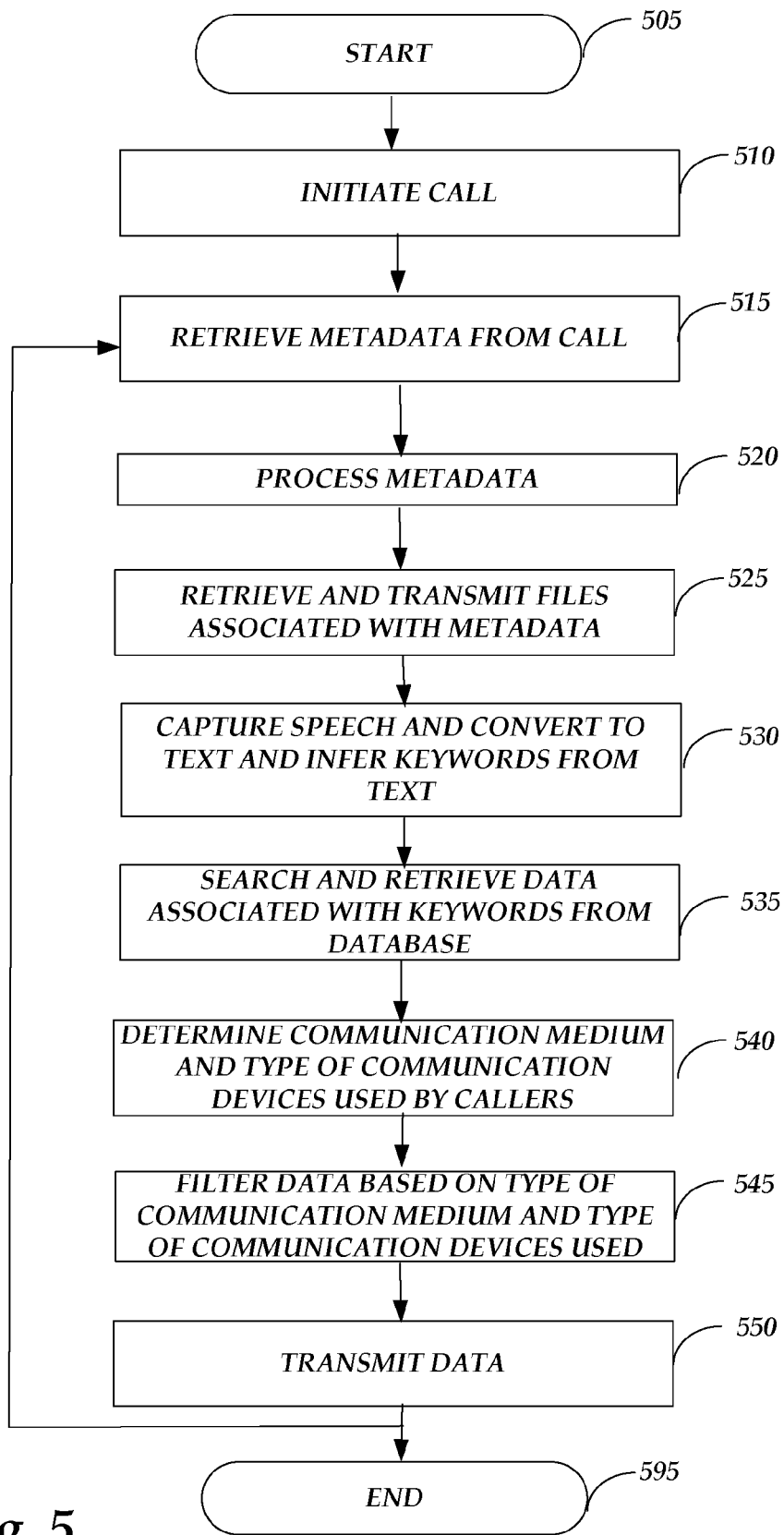
FIG. 5 is a logical flow diagram illustrating a method for automatic information distribution during voice communication initiated on a device configured to facilitate voice communication.

Having described an operating environment for and components of a system that facilitates automatic information distribution during a call with reference to FIGS. 1-4 above, FIG. 5 is a logical flow diagram illustrating a method for automatically providing call data other than caller identification data following initiation of a call. The routine 500 begins at start operation 505 and proceeds to operation 510 where a call is initiated 510. The system receives an indicator associated with the initiated call that includes metadata that is used for identifying information that may be associated with the initiated call. The system retrieves the metadata from the indicator 515 and processes the metadata 520 to identify information associated therewith. Processing of metadata involves searching a database for information associated with the metadata and retrieving the information 525 and preparing it for transmission to parties involved in the telephone call. The method of automatic information distribution also involves the capturing of speech from the conversation between parties and converting the speech to text 530. The text is further filtered and refined to generate keywords for use in data base searching that facilitates the retrieval of data associated with keywords form a database 535. Next a determination of the communication medium upon which the telephone call is transmitted is determined, along with a determination of the type of communication devices being used by the callers involved in the communication 540. Based on the type of communication medium and the type of communication devices involved in the communication, data is filtered 545 and only data compatible with the device or communication medium is transmitted 550. While the call is in progress, the routine loops back to operation 515 to obtain new metadata associated with the call as the call proceeds. The routine 500 ends at operation 595

An example of the system functioning in a client server environment would be when an individual calls into a customer service center and is communicating with a customer service representative. By way of example the customer indicates to the customer service representative that their ABC brand laptop is no longer working. Information concerning ABC brand laptops is transmitted to the customer service representative. More likely than not, the computer may pose a question on the display for the customer service representative, instructing them to ask the caller for the model of the laptop and what their name is. Upon the customer providing the model name of the laptop and what their name is, the voice recognition module shall transmit text to the content analyzer which generates keywords which are used to locate the individual's records concerning their warranty on their ABC laptop. Upon an indication of the problem by the customer, the system transmits to the customer service representative a list of steps which are to be used in trouble shooting the problem with the computer. When the customer service representative provides the first step and the person indicates, "I already tried that," the system can understand that communication and skip to the next logical step, allowing the customer service representative to perform process of elimination a lot faster and thereby speed this type of customer service interaction. The speech to text converter module and content analyzer module that automatically generates keywords for searching can help the customer service representative and the customer identify issues and solve problems at a faster pace based on the system drawing inferences from comments by the customer.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of appending content to voice communication, comprising:
   receiving an indicator of an initiated voice call, wherein the indicator includes metadata used for identifying information that may be associated with the initiated voice call, the metadata being transmitted with the voice call and comprising at least a link to a shared data site at which parties participating in the voice call are provided temporary access in order to access a file share, the file share comprising data associated with a called party;
   processing the indicator to identify at least one database for searching;
   searching the at least one database for the information that may be associated with the initiated voice call;
   retrieving the information that may be associated with the initiated voice call; and
   transmitting, in real-time, select information to at least one party participating in the voice call.

2. The method of claim 1 wherein the select information identified and transmitted is automatically controlled by a set of data transmission rules that are dependent upon the type of communication devices involved in initiating and receiving the call.

3. The method of claim 2 wherein the select information transmitted is sent to the device upon which the call is initiated and the device upon which the call is received while the call is in process.

4. The method of claim 2 wherein the communication devices involved in initiating and receiving the call are one of the following devices, an analog phone, a digital phone, a VoIP phone, a video phone, a computer, and a mobile phone.

5. The method of claim 1 further comprising the step of extracting metadata from the initiated call, and wherein the step of searching a database for information associated with the initiated call is performed through use of the extracted metadata, wherein information stored within the database includes associated metadata tags.

6. The method of claim 1 further comprising a step of filtering the content of the conversation between the parties in order to identify key words utilized in the following process:
   automatically searching the at least one database for information associated with the key words; and
   transmitting information identified as associated with the key words to at least one party participating in the call.

7. The method of claim 6 wherein the step of automatically searching a database for information associated with the key words further comprises a step of utilizing the metadata associated with the call to further refine the information identified as associated with the key words.

8. The method of claim 1 further comprising the step of transmitting metadata that facilitates the identification of files associated with the initiated call upon initiation of the call, whereby the metadata transmitted is parsed by a search engine and used to identify files for transmission to at least one party participating in the call.

9. The method of claim 1 wherein an intermediary system is operationally connected to the database and configured to:
   receive the indication of an initiated call;
   extract metadata from the initiated call;
   facilitate searching of the database for information associated with the metadata using the metadata extracted; and
   transmit the information identified as associated with the metadata to the at least one party participating in a call.

10. A computer implemented system that facilitates appending content to a communication, comprising:
    a content analyzer configured to:
    receiving metadata associated with initiated voice communications, the metadata being transmitted with the voice call and comprising at least a link to a shared data site at which parties participating in the voice call are provided temporary access in order to access a file share, the file share comprising data associated with a called party;

process the voice communications and infer the substance of a conversation there from;

search a database for content relevant to the substance of the conversation; and transmit at least a subset of the content identified as relevant to the substance of the conversation to at least one party of a conversation during the conversation.

11. The system of claim 10 wherein the content analyzer is within an initiating client system and searches a database within the initiating client system for content relevant to the substance of the conversation, wherein the initiating client system retrieves data files including content relevant to the substance of the conversation and automatically transmits the retrieved data files to a receiving client system associated with the communication.

12. The system of claim 10 wherein the content analyzer is within a receiving client system and searches a database within the receiving client system for content relevant to the substance of the conversation, wherein the receiving client system retrieves and presents the data files including content relevant to the substance of the telephone to the receiving client system.

13. The system of claim 10 wherein the content analyzer includes speech a recognition engine configured to facilitate automatic interpretation of speech and initiation of database searching in response to words spoken by parties involved in voice communication.

14. The system of claim 13 wherein the speech recognition engine is configured to infer from the content of the conversation between the participating parties command terms that are automatically used to perform command functions that include at least one of the following commands, retrieve data, send data, determine availability of additional voice communication participant, and initiate voice call to the additional voice communication participant.

15. The system of claim 14 wherein the command of determining the availability of an additional voice communication participant is followed up by automatically initiating communication with the additional voice communication participant, wherein the communication initiated is comprised of voice and data transmissions, wherein the data communication includes contextual information which provides the additional voice communication participant with context for the call into which they are requested to join.

16. The system of claim 14 wherein the content inferred from conversation may include the name of individuals, wherein the name inferred is searched in combination with other contextual information against names within the system database for a match, wherein when a match is found, the system identifies the individual and requests confirmation from at least one voice communication participant that the individual identified is the correct individual.

17. The system of claim 10, wherein the content analyzer is on a server to which a communication initiating system and a communication receiving system are operatively connected, wherein the server determines the information which may be transmitted to the initiating client system and the receiving client system based on the type of initiating system and receiving system used.

18. A computer readable storage device containing executable instructions which when executed by a computer perform a method of automatically transmitting content associated with a call to a receiving party, comprising:

receiving metadata associated with an initiated voice call, the metadata being transmitted with the voice call and comprising at least a link to a shared data site at which parties participating in the voice call are provided temporary access in order to access a file share, the file share comprising data associated with a called party;

processing voice communications and inferring there from the substance of a call;

searching a database for content relevant to the substance of the call; and transmitting at least a subset of the content identified as relevant to the substance of the call to at least one party of a conversation during the conversation.

19. The computer readable storage device of claim 18 further comprising executable instructions which when executed by a computer perform a method of automatically providing information associated with a call, comprising:

processing the metadata to identify at least one database for searching;

searching the at least one database for information associated with the initiated call;

retrieving information associated with the initiated call from the at least one database; and transmitting information associated with the initiated call to at least one party participating in a call.

20. The computer readable storage device of claim 19 further comprising executable instructions that perform speech recognition that facilitates automatic interpretation of speech and initiation of supplemental database searching in response to words spoken interpreted as voice commands, wherein the data files identified in the supplemental database searching performed are identified based on terms interpreted from the voice communication and transmitted to at least one of the parties involved in the voice communication.

* * * * *